United States Patent
Ma et al.

(10) Patent No.: US 9,904,083 B2
(45) Date of Patent: Feb. 27, 2018

(54) DISPLAY HOUSING AND DISPLAY DEVICE

(71) Applicant: BOE Technology Group Co., Ltd., Beijing (CN)

(72) Inventors: Yongda Ma, Beijing (CN); Yong Qiao, Beijing (CN); Jianbo Xian, Beijing (CN); Jian Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/906,494

(22) PCT Filed: Jun. 15, 2015

(86) PCT No.: PCT/CN2015/081418
§ 371 (c)(1),
(2) Date: Jan. 20, 2016

(87) PCT Pub. No.: WO2016/110050
PCT Pub. Date: Jul. 14, 2016

(65) Prior Publication Data
US 2016/0320659 A1   Nov. 3, 2016

(30) Foreign Application Priority Data

Jan. 9, 2015 (CN) .................... 2015 2 0016782 U

(51) Int. Cl.
*G02F 1/1333* (2006.01)
*G02F 1/13* (2006.01)
(Continued)

(52) U.S. Cl.
CPC .......... *G02F 1/133308* (2013.01); *G02F 1/13* (2013.01); *H04N 5/64* (2013.01);
(Continued)

(58) Field of Classification Search
CPC ............. G02F 1/1333; G02F 1/133308; G02F 2001/133314; G02F 2001/133317;
(Continued)

(56) References Cited

U.S. PATENT DOCUMENTS

| 5,905,550 A * | 5/1999 | Ohgami ............ G02F 1/133308 349/58 |
| 2006/0171172 A1* | 8/2006 | Li ........................ G02B 6/0086 362/633 |
| 2006/0290836 A1* | 12/2006 | Chang .................. G02B 6/0088 349/58 |

FOREIGN PATENT DOCUMENTS

| CN | 1567040 A | 1/2005 |
| CN | 2728171 Y | 9/2005 |

(Continued)

OTHER PUBLICATIONS

Oct. 13, 2015—(WO)—International Search Report and Written Opinion Appn PCT/CN2015/081418 with English Tran.

*Primary Examiner* — Thoi Duong
(74) *Attorney, Agent, or Firm* — Banner & Witcoff, Ltd.

(57) ABSTRACT

A display housing and a display device are disclosed. The display housing includes a front frame and a rear cover. A first hook and a first slot are disposed on the front frame, and a second slot and a second hook are disposed on the rear cover. The front frame and the rear cover are configured to be fixedly connected by snapping the first hook into the second slot and snapping the first slot into the second hook. The display housing may resolve the problem of assembling efficiency being low due to threaded connection.

15 Claims, 5 Drawing Sheets

(51) Int. Cl.
  *H05K 5/02*      (2006.01)
  *H04N 5/64*      (2006.01)
(52) U.S. Cl.
  CPC ..... *H05K 5/02* (2013.01); *G02F 2001/13332* (2013.01); *G02F 2001/133314* (2013.01); *G02F 2201/465* (2013.01)
(58) Field of Classification Search
  CPC .......... G02F 2001/13332; G02F 2001/133322; G02F 2201/465; G03B 21/145; G09F 15/0037; G09F 15/0012; G09F 19/228; G09F 7/18; A45C 2013/1015; A45C 2013/267; A45C 11/00; A45C 13/1023; A45F 5/00; A45F 2005/008; A45F 2200/0575; A61M 15/0081
  USPC ...................... 349/58, 60; 362/632, 633, 634
  See application file for complete search history.

(56)           References Cited

FOREIGN PATENT DOCUMENTS

| CN | 102162942 A | 8/2011 |
| CN | 102256457 A | 11/2011 |
| CN | 103216790 A | 7/2013 |

\* cited by examiner

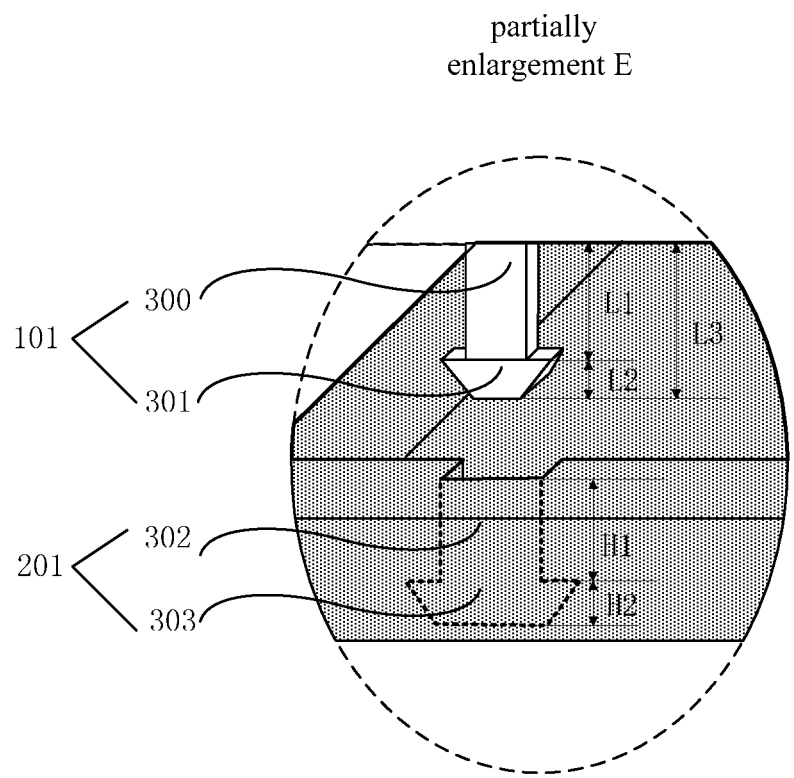
Figure 2b
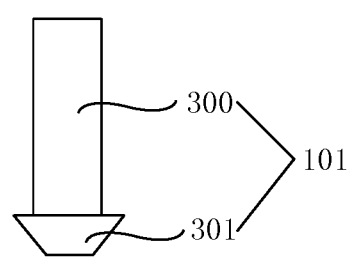
图 2c cross-section O-O' cross-section O-O'

DISPLAY HOUSING AND DISPLAY DEVICE

The application is a U.S. National Phase Entry of International Application No. PCT/CN2015/081418 filed on Jun. 15, 2015, designating the United States of America and claiming priority to Chinese Patent Application No. 201520016782.8 filed on Jan. 9, 2015. The present application claims priority to and the benefit of the above-identified applications and the above-identified applications are incorporated by reference herein in their entirety.

TECHNICAL FIELD

At least one embodiment of the present invention relates to a display housing and a display device.

BACKGROUND

As a flat display device, a liquid crystal display is more and more widely applied in the field of high performance display, because the liquid crystal display has smaller size, lower power consumption, no radiation and relatively low manufacturing cost.

For example, the liquid crystal display may include a display panel having a liquid crystal layer, and a backlight module. During assembling of the liquid crystal display, a front frame is disposed at a displaying side of the display panel and a rear cover is disposed at a non-light-outlet side of the backlight module, so as to protect the display panel and the backlight module.

SUMMARY

At least one embodiment of the invention provides a display housing and a display device to resolve a problem of assembling efficiency being low by threaded connection.

At least one embodiment of the invention provides a display housing, comprising a front frame and a rear cover. A first hook and a first slot are disposed on the front frame, and a second slot and a second hook are disposed on the rear cover. The front frame and the rear cover are configured to be fixedly connected by snapping the first hook into the second slot and snapping the first slot into the second hook.

At least one embodiment of the invention provides a display device, including the above described display housing.

BRIEF DESCRIPTION OF THE DRAWINGS

In order to clearly illustrate the technical solution of embodiments of the invention, the drawings of the embodiments will be briefly described in the following; it is obvious that the described drawings are only related to some embodiments of the invention and thus are not limitative of the invention.

FIG. 2*b* is a partial structure diagram of an display housing provided by the embodiment of the invention;

FIG. 2*c* is a cross-section diagram of a first hook provided by the embodiment of the invention;

REFERENCE SIGNS

100—front frame; 101—first hook; 102—first slot; 200—rear cover; 201—second slot; 202—second hook; 300—first support column; 301—head; 302—extension part; 303—catching part; 400—a second support column; 401—notch; 500'—sidewall of the rear cover; 500—sidewall of the rear cover; A—snapping face of the sidewall of the rear cover; A'—snapping face of the sidewall of the front frame; B—inner side of the sidewall of the rear cover; B'—inner side of the sidewall of the front frame; C—outer side of the sidewall of the rear cover; C'—outer side of the sidewall of the front frame.

DETAILED DESCRIPTION

In order to make objects, technical details and advantages of the At least one embodiment of the invention apparent, the technical solutions of the embodiments will be described in a clearly and fully understandable way in connection with the drawings related to the At least one embodiment of the invention. Apparently, the described embodiments are just a part but not all of the At least one embodiment of the invention. Based on the described embodiments herein, those skilled in the art can obtain other embodiment(s), without any inventive work, which should be within the scope of the invention.

During research, the applicant(s) noticed that in a process of assembling a liquid crystal display, threaded connections are used for locking front frames and rear covers. However, in the process of assembling, models of screws or bolts should be determined according to display devices with different sizes. In addition, during a process of locking, a screw thread may be damaged if force is applied unevenly, and during a process of disassembling, the disassembled screws or bolts should be well stored to prevent from going missing. Thus, it requires more working hours and cost to assemble or disassemble displays by means of above-described locking, and results in lowering production efficiency.

Figure 1:
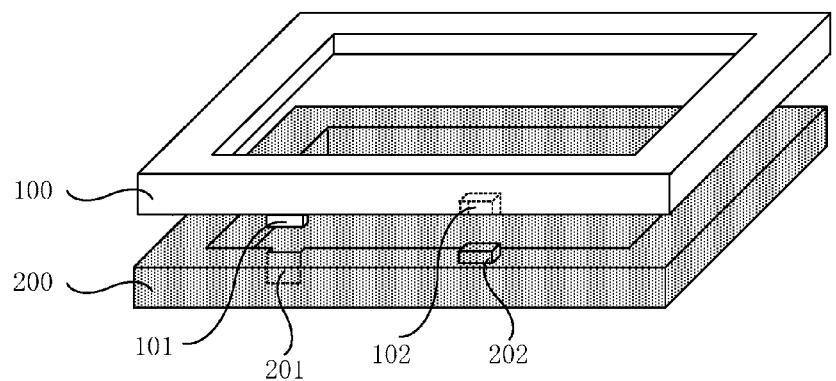
FIG. 1 is a structure diagram of a display housing provided by an embodiment of the invention.

At least one embodiment of the invention provides a display housing. As shown in FIG. 1, the display housing may include a front frame 100 and a rear cover 200.

In the display housing, a first hook 101 and a first slot 102 are disposed on the front frame 100, and a second slot 201 and a second hook 202 are disposed on the rear cover 200. The front frame 100 and the rear cover 200 are fixedly connected by snapping the first hook 101 into the second slot 201, and snapping the first slot 102 into the second hook 202.

At least one embodiment of the invention provides a display housing and a display device. The display housing includes a front frame and a rear cover. A first hook and a first slot are disposed on the front frame, and a second slot and a second hook are disposed on the rear cover. As such, in one hand, during a process of assembling, the front frame and the rear cover are fixedly connected by snapping the first hook into the second slot and snapping the first slot into the second hook. During disassembling, it only requires to detach the first hook from the second slot and detach the first slot from the second hook, so that the problem of assembling efficiency being low threaded connection can be avoided. On the other hand, the connection of the front frame and the rear cover can be made more tight, because hooks and slots are disposed on the front frame and the rear cover. For example, when the front frame moves relatively from the rear cover so that the first hook on the first frame is in a trend of slipping off the second slot, the second hook catched in the first slot on the rear cover may provide resistance to stop the front frame from slipping, so that detachment of the front frame and the rear cover may be prevented when the front frame or the rear cover moves relatively from the other.

Details of the first hook 101 and the first slot 102 provided on the front frame 100 and the second slot 201 and the second hook 202 provided on the rear cover 200 will be described in specific embodiments.

First Embodiment

Figure 2A:
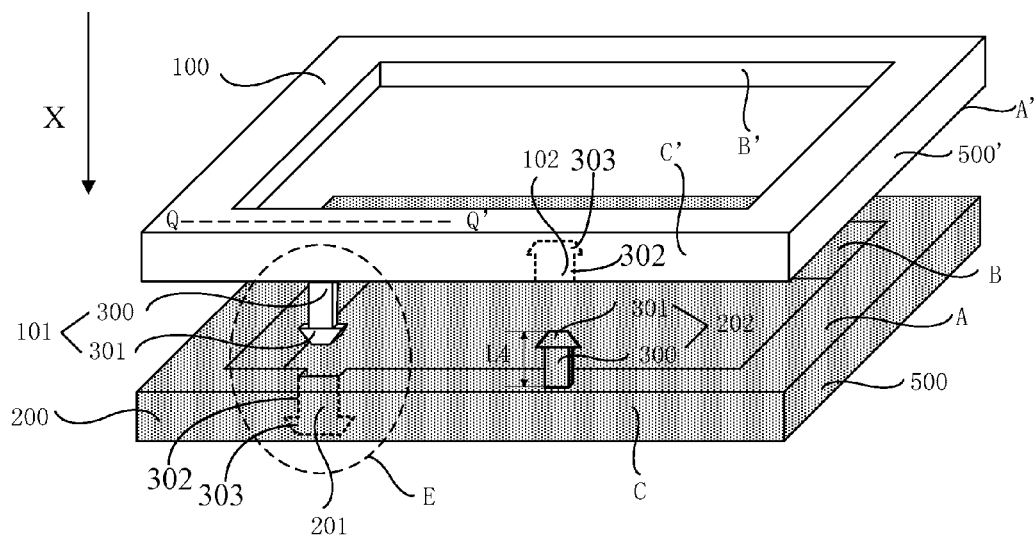
FIG. 2*a* is an structure diagram of another display housing provided by an embodiment of the invention.

As shown in FIG. 2a, the first hook 101 may include a first support column 300, with one end connected to the front frame 100, and a head 301 at the other end of the first support column 300. The second slot 201 is provided with a extension part 302 having a same shape as the first support column 300 and a catching part 303 having a same shape as the head 301.

Optionally, the second hook 202 may include a first support column 300 with one end connected to the rear cover 200, and a head 301 at the other end of the first support column 300. The first slot 102 is provided with the extension part 302 having a same shape as the first support column 300 and a catching part 303 having a same shape as the head 301.

For example, the first slot 102 may be disposed on an inner side B' of a sidewall 500' of the front frame 100, or an outer side C' of the sidewall 500' of the front frame 100. Optionally, the second slot 201 may be disposed on an inner side B of a sidewall 500 of the rear cover 200, or an outer side C of the sidewall 500 of the rear cover 200. In a process of snapping the front frame 100 into the rear cover 200, the head 301 deforms in the extension part 302. And when the head 301 is catched into the catching part 303, deformation is restored to achieve a fix connection of the front frame 100 and the rear cover 200.

As shown in FIG. 2b (a partial enlargement view for Part E of FIG. 2a), sizes of the hook and the slot will be explained by taking the first hook 101 and the second slot 201 as examples.

For example, a length L1 of the first support column 300 of the first hook 101 equals to a length H1 of the extension part 302 of the second slot 201, a length L2 of the head 301 of the first hook 101 is less than or equals to a length H2 of the catching part 303 of the second slot 201. Sizes of the second hook 202 and the first slot 102 are similar to the above.

In this way, the front frame 100 and the rear cover 200 are seamless connected, after the first hook 101 is snapped into the second slot 201, and the second hook 202 is snapped into the first slot 102. That is, a snapping face A' of the sidewall 500' of the front frame 100 and a snapping face A of the sidewall 500 of the rear cover 200 may be bonded tightly, so as to increase sealability of a product.

Because the first hook 101 or second hook 202 is provided with the first support column 300, contact area between the first hook 101 and the second slot 201 or the second hook 202 and the first slot 102 is increased, so that when the front frame 100 moves relatively from the rear cover 200, force area of reverse thrust may be increased and a bonding force of the front frame 100 and the rear cover 200 may be increased when the front frame 100 and the rear cover 200 move relatively.

It should be noted that, firstly, for example, a shape of the above-described head 301 may include many shapes, such as cuboid, cube, polygonal prism, trapezoid, and a hemisphere less than or equal to ½ of a sphere. As shown in FIG. 2c (cross-section view along dashed line Q-Q' in FIG. 2a), a first cross-section of the head 301 may be a rectangle cross-section, a square cross-section, a triangular cross-section, a trapezoidal cross-section, a cross-camber or the like. The first cross-section of the head 301 being a trapezoidal cross-section will be described as an example. The first cross-section is parallel to the outer side or inner side of the sidewall, which is provided with the head 301. That is, the first cross-section is parallel to a snapping direction X (as shown in FIG. 2a). For example, as shown in FIG. 2a, the head 301 is disposed on a sidewall of the front frame 100, and the first cross-section is parallel to the outer side C' or inner side B' of the sidewall of the front frame 100.

Secondly, for example, a length L3 of the first hook 101 (as shown in FIG. 2b) may be different from a length L4 of the second hook 202 (as shown in FIG. 2a). For example, because the length L3 of the first hook 101 or the length L4 of the second hook 202 equals to a sum of the length L1 of the first support column 300 and the length L2 of the head 301, it is possible to adjust the length L1 of the first support column 300 or the length L2 of the head 301 so that the length L3 of the first hook 101 is different from the length L4 of the second hook 202.

For example, the length L3 of the first hook 101 is greater than the length L4 of the second hook 202. In this way, when the front frame 100 or the rear cover 200 moves relatively under an external force, even the second hook 202 has a trend to slip off the first slot 102 by the external force, the bonding force between the front frame 100 and the rear cover 200 may be guaranteed effectively so as to prevent from falling apart under the external force, because the length L3 of the first hook 101 is relatively long and a contact area with the second slot 201 is relatively large. Thus, it is not necessary to configure both lengths of the first hook 101 and second hook 202 to be very long, to increase the bonding force between the front frame 100 and the rear cover 200 when they move relatively.

Second Embodiment

Figure 3:
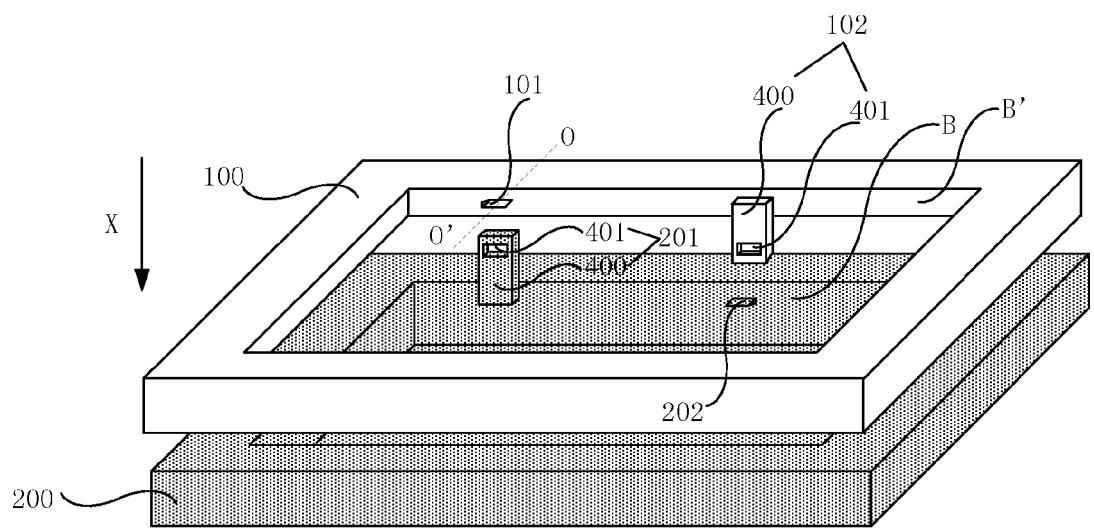
FIG. 3 is a structure diagram of another display housing provided by an embodiment of the invention.

As shown in FIG. 3, the first slot 102 or second slot 201 may include a second support column 400 with one end connected to the front frame 100 or the rear cover 200, and a notch 401 at the other end of the second support column 400.

Figure 4A:
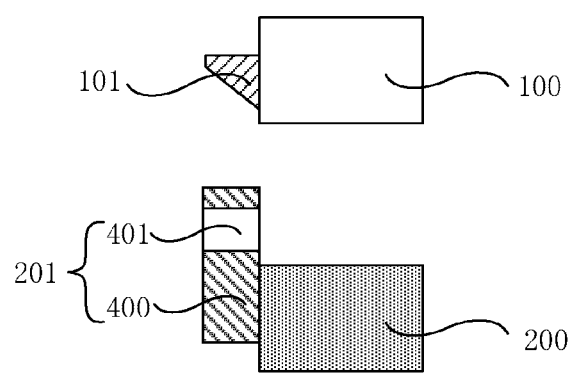
FIG. 4*a* is a partial structure diagram of another display housing provided by the embodiment of the invention.
Figure 4B:
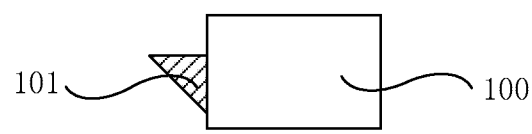
FIGS. 4*b* and 4*c* are two cross-section shape diagrams of a first hook or a second hook provided by the embodiment of the invention.
Figure 4C:

For example, as shown in FIG. 4a (cross-section view along O-O' in FIG. 3), a second cross-section of the first hook 101 or the second hook 202 (a cross-section along O-O') is a right trapezoid, to be catched into the notch 401. Certainly, a shape of the second cross-section of the first hook 101 or the second hook 202 may be a right triangular as shown in FIG. 4b, or a sector as shown in FIG. 4c. Other shapes will be omitted herein. In the embodiment, the second cross-section is parallel to a snapping direction X (as shown in FIG. 3), and perpendicular to the first cross-section.

For example, in order to make the outer side of the front frame 100 and the rear cover 200 smooth and nice-looking, the first hook 101 and the first slot 102 are disposed on the inner side B' of the sidewall of the front frame 100, and the second slot 201 or the second hook 202 is disposed on the inner side B of the sidewall of the rear cover 200.

Figure 5:
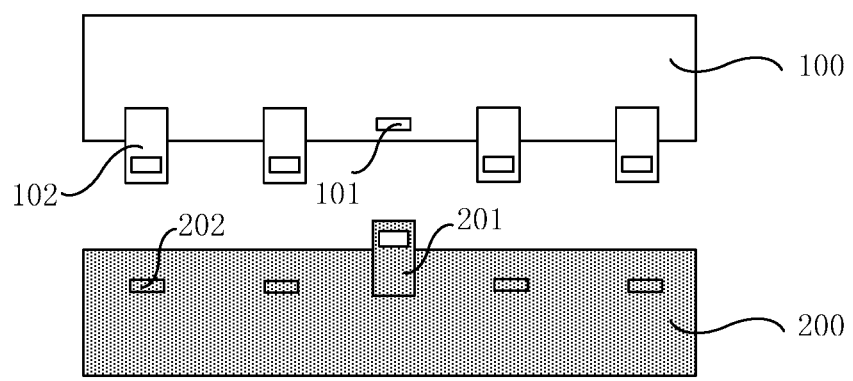
FIG. 5 is a lateral view of a display housing provided by the embodiment of the invention.

It should be explained that, numbers and arrangements of the first hook 101 and first slot 102 on the front frame 100 as well as the second slot 201 and the second hook 202 on the rear cover 200 are not specified by the embodiment. For example, as shown in FIG. 5, one first hook 101 is disposed every two first slots 102 on the front frame 100. In this case, the second slot 201 and second hook 202 on the cover are disposed correspondingly. Alternatively, for example, the first hook 101 and the first slot 102 are disposed at an interval on the front frame 100. Correspondingly, the second slot 201 and the second hook 202 are disposed at an interval on the rear cover 200. Other arrangements that fall within the scope of the invention will be omitted.

An implementation of the first hook 101 and the first slot 102 being disposed at an interval on the front frame 100 and the second slot 201 and the second hook 202 being disposed at an interval on the rear cover 200 will be described by following specific embodiments.

Third Embodiment

An implementation of a first hook 101 including a first support column 300 and a head 301 as shown in FIG. 2 and a first slot 102 including a second support column 400 and a notch 401 as shown in FIG. 3 will be described as an example by the embodiment in combination with FIG. 6. Certainly, when the first hook and the first slot both include support columns, numbers and arrangements of the first hook 101 and first slot 102 on the front frame 100 as well as the second slot 201 and second hook 202 on the rear cover 200 may varies, and are not limited by FIG. 6.

Figure 6:
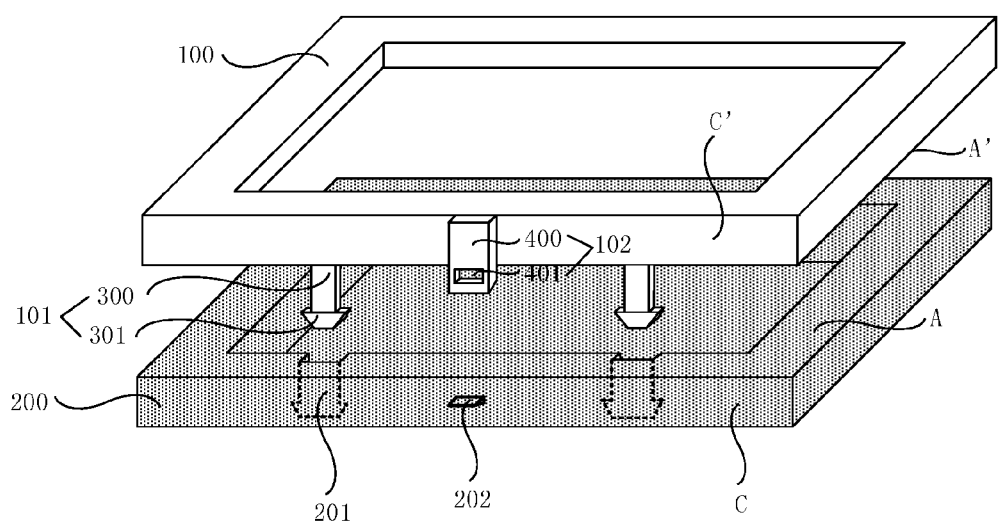
FIG. 6 is a structure diagram of still another display housing provided by an embodiment of the invention.

As shown in FIG. 6, for example, the first hook 101 is disposed on a snapping face A' of a sidewall of the front frame 100, and the second slot 201 is disposed on a snapping face A of a sidewall of the rear cover 200. The first slot 102 is disposed on an outer side C' of a sidewall of the front frame, and the second hook 202 is disposed on an outer side C of a sidewall of the rear cover 200.

In this way, on one hand, when the front frame 100 is moved relatively from the rear cover 200 by a first external force parallel to an upper surface of the front frame 100, the first hook 101 in the second slot 201 may generate a reaction force opposite to the first external force to stop the first hook 101 from slipping off the rear cover 200, although the first slot 102 is in a trend of slipping off the second hook 202. On the other hand, when the front frame 100 is moved apart from the rear cover 200 by a second external force perpendicular to the upper surface of the front frame 100, the second hook 202 in the first slot 102 may generate a reaction force opposite to the second external force to stop the front frame 100 from falling apart from the rear cover 200, although the first hook 101 is in a trend of slipping off the second slot 201.

Besides, with respect to any of the above-mentioned embodiments, firstly, the first hook 101 and the first slot 102 may be in a monoblock (one-body) structure with the front frame 100. Optionally, the second slot 201 and the second hook 202 may be in a monoblock structure with the rear cover 200. Therefore, it improves abilities to bear external forces for the first hook 101 and first slot 102 as well as the second slot 201 and the second hook 202, and further increases a bonding force between the front frame 100 and the rear cover 200.

Secondly, for example, a horizontal center line (Q-Q') of the first hook 101 is in line with a horizontal line (Q-Q') of the first slot 102, or a horizontal center line (Q-Q') of the second slot 201 is in line with a horizontal center line (Q-Q') of the second hook 202. The above horizontal center lines (Q-Q') are parallel to the snapping face A' of the front frame 100 or the snapping face A of the rear cover 200. In this way, the front frame 100 and the rear cover 200 may be under the same pressure after the above hooks are snapped into and slots, avoiding one or more pairs of hooks and slots to be broken up due to uneven pressure.

Thirdly, for example, the first hook 101 or the first slot 102 are disposed on each of four sidewalls 500' of the front frame 100, and the second hook second slot 201 or second slot 201 are disposed on each of four sidewalls 500 of the rear cover 200. In this way, all of the sidewalls 500 of the front frame 100 or the rear cover 200 may be connected so as to improve connection tightness of the front frame 100 and the rear cover 200.

Certainly, the above hooks and slots may also be disposed at four corners of the front frame 100 or the rear cover 200. Specific arrangements may refer to the first embodiment to the third embodiment, and they will be omitted herein.

At least one embodiment of the invention further provides a display device, which comprises the display housing of any one of the above embodiments.

For example, the display device may be a liquid crystal display that requires a backlight module. In this case, a front frame of the display housing is disposed at a displaying side of a display panel, and a rear cover of the display housing is disposed at a non-light-outlet side of the backlight module, so as to protect the display panel and the backlight module.

For example, with respect to a reflective liquid crystal display without a backlit module, an OLED (Organic Light Emitting Diode) display device, or the like, the front frame of the display housing may be disposed at a displaying side of the display panel, and the rear cover of the display housing may be disposed at a back side of an array substrate of the display device (that is, a side away from the displaying side of the display device), so as to protect the display panel and the backlight module.

The display device provided by the embodiment of the invention may be a liquid crystal display, an OLED display device, electric paper, a cell phone, a tablet computer, a TV set, a display, a laptop computer, a digital frame, a navigator or any product or means having a display function.

The above descriptions are merely exemplary embodiments of the invention, and do not restrict the scope of the invention. The scope of the invention should be defined by accompanying claims.

The application claims priority of Chinese Patent Application No. 201520016782.8 filed on Jan. 9, 2015, the disclosure of which is incorporated herein by reference in its entirety as part of the present application.

The invention claimed is:

1. A display housing comprising a front frame and a rear cover, wherein,
   a first hook and a first slot are disposed on the front frame, and a second slot and a second hook are disposed on the rear cover;
   the front frame and the rear cover are configured to be fixedly connected by snapping the first hook into the second slot and snapping the first slot into the second hook, and the first hook and the first slot are disposed on the front frame at an interval; and the first slot or the second slot comprises a second support column with one end connected to the front frame or the rear cover, and a notch at the other end of the second support column.

2. The display housing according to claim 1, wherein,
the first hook comprises a first support column with one end connected to the front frame and a head at the other end of the first support column of the first hook, and the second slot is provided with an extension part having a same shape as the first support column of the first hook and a catching part having a same shape as the head of the first hook; and/or, the second hook comprises a first support column with one end connected to the rear cover and a head at the other end of the first support column of the second hook, and the first slot is provided with an extension part having a same shape as the first support column of the second hook and a catching part having a same shape as the head of the second hook.

3. The display housing according to claim 2, wherein,
the first slot is disposed at an inner side or an outer side of a sidewall of the front frame; and/or
the second slot is disposed at an inner side or an outer side of a sidewall of the rear cover.

4. The display housing according to claim 3, wherein, a length of the first support column equals to a length of the extension part, and a length of the head is less than or equals to a length of the catching part.

5. The display housing according to claim 2, wherein, a first cross-section of the head of the first or second hook is a rectangle cross-section, a square cross-section, a triangular cross-section, a trapezoidal cross-section, or a camber cross-section, and the first cross-section is parallel to an outer side or an inner side of a sidewall, which is provided with the head.

6. The display housing according to claim 1, wherein,
the first slot is disposed at an inner side or an outer side of a sidewall of the front frame; and/or
the second slot is disposed at an inner side or an outer side of a sidewall of the rear cover.

7. The display housing according to claim 1, wherein, a length of the first hook is different from a length of the second hook.

8. The display housing according to claim 1, wherein, a second cross-section of the first hook or the second hook is a right trapezoid, a right triangle, or a sector, and the second cross-section is parallel to a snapping direction and perpendicular to a first cross-section.

9. The display housing according to claim 1, wherein, the first hook and the first slot are disposed at an inner side of a sidewall of the front frame; and
the second slot or the second hook is disposed at the inner side of a sidewall of the rear cover.

10. The display housing according to claim 1, wherein,
the second slot and the second hook are disposed on the rear cover at an interval.

11. The display housing according to claim 1, wherein, the first hook comprises a first support column and a head of the first hook, and the first slot comprises the second support column and the notch,
the first hook or the second slot is disposed on a snapping face of a sidewall of the front frame or the rear cover; and
the first slot or the second hook is disposed on an outer side of a sidewall of the front frame or the rear cover.

12. The display housing according to claim 1, wherein,
the first hook and the first slot are in a monoblock structure with the front frame; and/or
the second slot and the second hook are in a monoblock structure with the rear cover.

13. The display housing according to claim 1, wherein,
a horizontal center line of the first hook is in line with a horizontal center line of the first slot, or
a horizontal center line of the second slot is in line with a horizontal center line of the second hook;
wherein, the horizontal center lines are parallel to a snapping face of the front frame or the rear cover.

14. The display housing according to claim 1, wherein,
the first hook or the first slot is disposed on each of four sidewalls of the front frame; and
the second hook or the second slot is disposed on each of four sidewalls of the rear cover.

15. A display device, comprising the display housing according to claim 1.

* * * * *